2,681,663

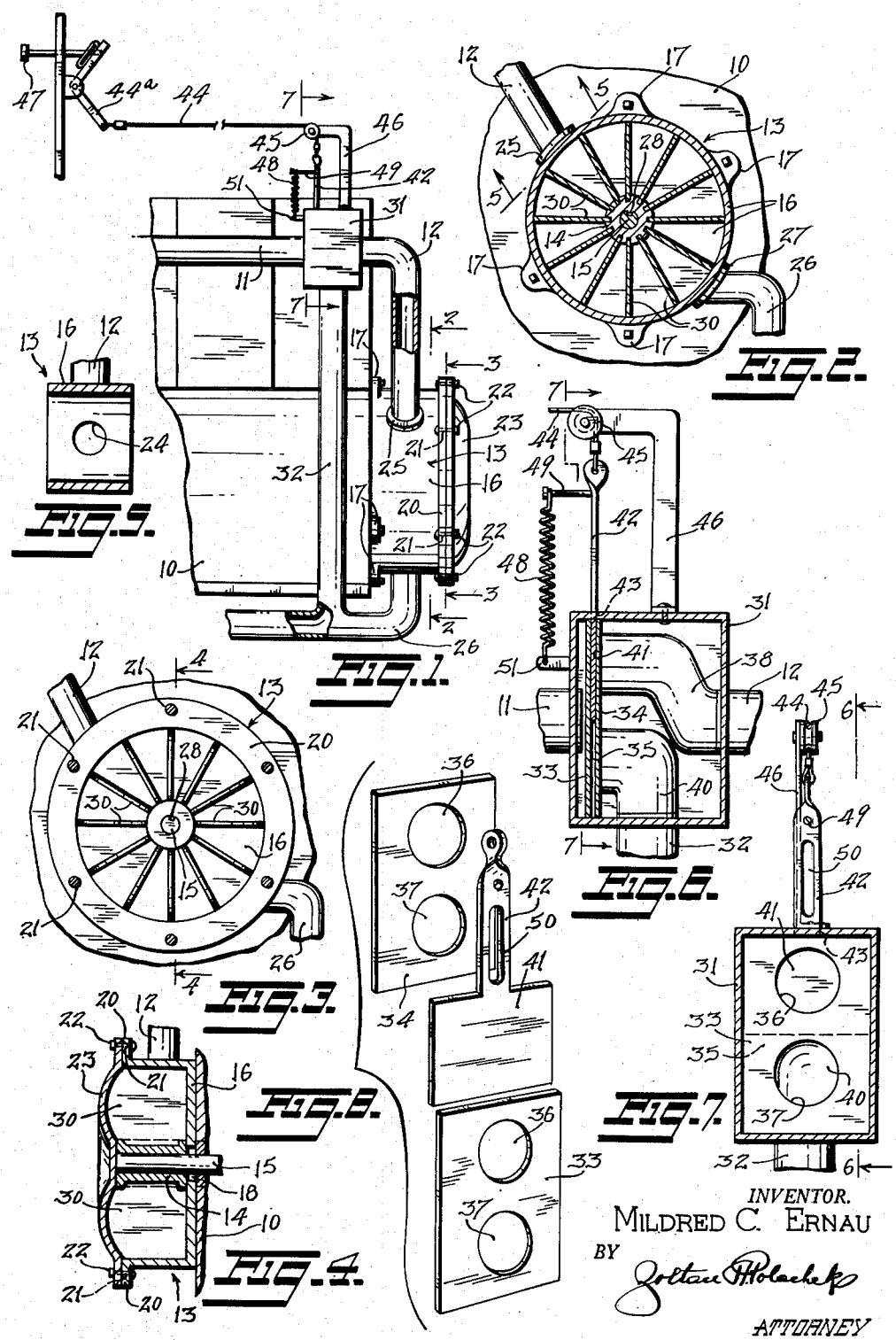
June 22, 1954 — M. C. ERNAU — 2,681,663
EXHAUST VALVE DEVICE FOR COMBUSTION AND DIESEL ENGINES
Filed Dec. 15, 1949
INVENTOR.
MILDRED C. ERNAU
BY
ATTORNEY Patented June 22, 1954

UNITED STATES PATENT OFFICE 2,681,663

EXHAUST VALVE DEVICE FOR COMBUSTION AND DIESEL ENGINES

Mildred C. Ernau, Leonia, N. J.

Application December 15, 1949, Serial No. 133,189

6 Claims. (Cl. 137—625.48)

This invention relates to improvements in internal combustion engines, especially gasoline and diesel engines used in trucks and buses.

The principal object of the invention is the provision of means for muffling the noise incident to the use of such engines, said means also assisting the engine flywheel in smoothing the rotative action of the engine crankshaft.

Another object of the invention is to mount said means directly on the crankshaft, thus simplifying the mechanism thereof and adapting it for economical manufacture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary side elevation of a portion of an internal combustion engine with the invention connected thereto.

Fig. 2 is a fragmentary sectional view on line 2—2 of Fig. 1.

Fig. 3 is a fragmentary sectional view on line 3—3 of Fig. 1.

Fig. 4 is a fragmentary sectional view on line 4—4 of Fig. 3.

Fig. 5 is a fragmentary sectional view on line 5—5 of Fig. 2.

Fig. 6 is a sectional view on line 6—6 of Fig. 7.

Fig. 7 is a sectional view on line 7—7 of Fig. 1 or Fig. 6.

Fig. 8 is an exploded isometric view of the means shown in Figs. 6 and 7.

Referring to Fig. 1, 10 indicates generally any diesel or gasoline engine such as those used in modern trucks and buses. The engine 10 is illustrated more or less diagrammatically, such mechanism being well known and for the most part not concerned in the invention. Only those parts of the engine directly concerned with the invention are illustrated in detail and described hereinafter.

The exhaust manifold 11 of the engine is connected by a pipe 12 with a gas turbine designated generally as 13 and whose rotor 14 (Figs. 2 and 3) is secured on the end of the engine crankshaft 15 which projects from the block of the engine.

The turbine 13 comprises a cylindrical casing 16 of suitable material having lugs 17 (Figs. 1 and 2) by which it can be secured to the engine 10 in position to encompass the crankshaft 15. To permit of the crankshaft entering the casing that surface of the latter which abuts the engine is provided with a hole 18 (Fig. 4). At its other end the casing 16 is provided with an external annular flange 20 (Figs. 3 and 4) having threaded holes 21 (Fig. 3) therein for cooperation with bolts 22 (Fig. 1) in securing a cover plate 23 on the casing.

At the point of connection of the pipe 12 with the casing 16 the latter is provided with a hole 24 to permit entry into the casing of the pressure of the exhaust gases from the engine. The pipe 12 and casing 16 may be joined in any suitable manner, but preferably the end of pipe 12 is provided with a curved annular flange 25 which is welded to the casing 16 about the hole 24 (Figs. 1 and 2).

Approximately diametrically opposed to the hole 24, the casing is provided with a similar hole (not shown) through which the pressure of the exhaust gases can pass into an exhaust pipe 26 (Figs. 1 and 2) secured to the casing by a flange 27 similar to the flange 25 described above. The pipe 26 is lead to any convenient point for expelling the pressure of the exhaust gases into the atmosphere.

As mentioned hereinbefore a rotor 14 is mounted on the crankshaft 15 within the casing 16, said rotor being secured on the shaft in any suitable way such as a key 28 (Figs. 2 and 3). Secured to the rotor and projecting radially therefrom are a plurality of turbine blades or vanes 30.

The construction is such that when the engine 10 is operated the exhaust gases therefrom are expelled through the pipe 12 against the blades 30 in casing 16, which blades are being rotated by the crankshaft on which they are secured. The pressure of the exhaust gases on said blades attempts to rotate the crankshaft faster, resulting in a more even crankshaft movement. In short the blades 30 act as an auxiliary flywheel. The gases after acting on the blades 30 are expelled into the atmosphere through pipe 26. At the same time the noises of the engine explosions are muffled by the blades 30 in their casing and no muffler is required for the exhaust pipe 26.

It will be seen therefore that there has been provided a device for utilizing the pressure of the exhaust gases of an internal combustion engine to assist the flywheel thereof in damping or smoothing the rotative action of the crankshaft, said device at the same time muffling the engine noise and making unnecessary the provision of a special muffler.

To overcome the resistance to starting the engine occasioned by the turbine of the invention, means are provided to feed the pressure of the exhaust gases directly from the exhaust manifold 11 to the exhaust pipe 26 at the time of starting the engine.

This means comprises a valve (Fig. 1) inserted between the exhaust manifold 11 and the pipe 12 and the exhaust pipe 26 and operable by the operator of the engine to allow the exhaust gases to flow through the turbine or not as desired.

The valve comprises a rectangular casing 31 having oppositely disposed holes into which the pipes 11 and 12 are threaded (Fig. 1) and having also a hole in its bottom side for a pipe 32 leading directly to exhaust pipe 26. Interiorly of the casing 31 there are provided two transverse plates 33 and 34 secured to the walls of the casing in any suitable manner to isolate atmospherically the areas on either side of the pair of plates and forming between them a slideway 35 (Fig. 6). The plates 33 and 34 are provided with aligned upper holes 36 and lower holes 37 (Figs. 7 and 8). The upper hole 36 in plate 34 is connected by a curved pipe 38 with the pipe 12 (Fig. 6) and the lower hole 37 by a pipe elbow 40 with the pipe 32, said connected pipes having their ends secured together in any suitable fashion.

Mounted in slideway 35 is a valve member 41 of rectangular shape and having a height larger than the diameter of the holes 36 and 37. At its upper edge member 41 is provided with an upwardly extending arm 42 which extends through a suitable slot 43 in the top of casing 31.

The construction is such that in Figs. 6 and 7 the valve member 41 is in its upper position and effectively blocks passage of exhaust gases from pipe 11 through holes 36 to pipe 38 and thence the turbine, said gases passing through holes 37 to pipe 40 and thence the exhaust pipe. However, by moving said member 41 to its lower position said lower holes will be blocked and the gases would flow through the upper holes 36 to the turbine.

To move the valve member 41 up and down as desired, the upper end of the arm 42 has attached thereto one end of a cable 44, the intermediate portion of which passes over a pulley 45 rotatively supported on a bracket 46 mounted on the top of the casing 31. The other end of the cable 44 is attached to one arm of a suitable bell crank 44ª pivotally mounted on the back side of the dashboard of the bus or truck in close proximity to the driver. A push button 47 is slidably mounted through the dashboard and has pin and slot connection with the other arm of the bell crank 44ª so that when the push button 47 is pushed inward the bell crank 44ª will be pivoted drawing on the cable 44 raising the valve member 41 to the position shown in Figs. 6 and 7.

The valve member 41 is normally held in a lowered position by a contraction spring 48 which operates between a pin 49 which extends from the arm 42 and a lug 51 which extends from the casing 31. Thus, when no pressure is applied to the push button 47, the spring 48 will function to retain the valve member 41 in its lowered position in which it closes the aligned holes 37.

It will be noted (Figs. 7 and 8) that the arm 42 is provided with a large slot 50 to minimize the area thereof when the valve member 41 is in its lowered position and the arm is positioned between the holes 36.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A valve for controlling the flow of exhaust gases of an engine through an exhaust manifold pipe to either a pipe connected to a crankshaft rotor casing or a discharge pipe, comprising a casing, a pair of inner walls in said casing, said walls forming compartments on either side of the pair and a slideway between the pair, aligned, upper and lower holes in said walls, a valve member mounted in said slideway to alternatively block the said upper or lower holes, an arm on said member projecting through said casing, resilient means urging said valve member in one direction, and manually operative means to move said valve member against the action of said resilient means.

2. A valve for controlling the flow of exhaust gases of an engine through an exhaust manifold pipe to either a pipe connected to the casing enclosing a crankshaft rotor or a discharge pipe, comprising a hollow casing, a pair of spaced walls mounted within said casing dividing the same into an inlet compartment and a second compartment, said walls having upper and lower pairs of aligned holes, a valve member slidably positioned between said walls, said valve member being of a height equal to one-half the height of said walls, and means for sliding said valve member to block either the upper or lower pair of holes.

3. A valve for controlling the flow of exhaust gases of an engine through an exhaust manifold pipe to either a pipe connected to the casing enclosing a crankshaft rotor or a discharge pipe, comprising a hollow casing, a pair of spaced walls mounted within said casing dividing the same into an inlet compartment and a second compartment, said walls having upper and lower pairs of aligned holes, a valve member slidably positioned between said walls, said valve member being of a height equal to one-half the height of said walls, and means for sliding said valve member to block either the upper or lower pair of holes, said sliding means comprising an arm extended vertically from said valve member and projected through the top of said casing, resilient means operating between said arm and said casing retaining said valve member in a lowered position, and manually operative means for raising said valve member against the action of said resilient means.

4. A valve for controlling the flow of exhaust gases of an engine through an exhaust manifold pipe to either a pipe connected to the casing enclosing a crankshaft rotor or a discharge pipe, comprising a hollow casing, a pair of spaced walls mounted within said casing dividing the same into an inlet compartment and a second compartment, said walls having upper and lower pairs of aligned holes, a valve member slidably positioned between said walls, said valve member being of a height equal to one-half the height of said walls, and means for sliding said valve member to block either the upper or lower pair of holes, said sliding means comprising an arm extended vertically from said valve member and projected through the top of said casing, resilient means operating between said arm and said casing retaining said valve member in a lowered position, and manually operable means for raising said valve member against the action of said resilient means, said resilient means comprising pins mounted on said casing and the projected upper end of said arm, and a contraction spring connected between said pins.

5. A valve for controlling the flow of exhaust gases of an engine through an exhaust manifold pipe to either a pipe connected to the casing enclosing a crankshaft rotor or a discharge pipe, comprising a hollow casing, a pair of spaced walls mounted within said casing dividing the same into an inlet compartment and a second compartment, said walls having upper and lower pairs of aligned holes, a valve member slidably positioned between said walls, said valve member being of a height equal to one-half the height of said walls, and means for sliding said valve member to block either the upper or lower pair of holes, said sliding means comprising an arm extended vertically from said valve member and projected through the top of said casing, resilient means operating between said arm and said casing retaining said valve member in a lowered position, and manually operable means for raising said valve member against the action of said resilient means, said manually operable means including a manually pullable cable connected at one end to the free end of said arm.

6. A valve for controlling the flow of exhaust gases of an engine through an exhaust manifold pipe to either a pipe connected to the casing enclosing a crankshaft rotor or a discharge pipe, comprising a hollow casing, a pair of spaced walls mounted within said casing dividing the same into an inlet compartment and a second compartment, said walls having upper and lower pairs of aligned holes, a valve member slidably positioned between said walls, said valve member being of a height equal to one-half the height of said walls, and means for sliding said valve member to block either the upper or lower pair of holes, said sliding means comprising an arm extended vertically from said valve member and projected through the top of said casing, resilient means operating between said arm and said casing retaining said valve member in a lowered position, and manually operable means for raising said valve member against the action of said resilient means, said arm having a slot closely adjacent said valve member to minimize the area of said arm when said valve member is in a lowered position blocking the lower holes and said arm extends across the upper holes of said walls.

References Cited in the file of this patent

UNITED STATES PATENTS

| Number | Name | Date |
|--------|------|------|
| 971,424 | Werner | Sept. 27, 1910 |
| 985,602 | Jones | Feb. 28, 1911 |
| 997,624 | Lewis | July 11, 1911 |
| 1,010,274 | Leisel | Nov. 28, 1911 |
| 1,214,322 | Kirby | Jan. 30, 1917 |
| 1,322,577 | Johnston | Nov. 25, 1919 |
| 1,780,828 | Leach et al. | Nov. 4, 1930 |
| 1,854,918 | Adams | Apr. 19, 1932 |
| 2,031,151 | Eulberg | Feb. 18, 1936 |
| 2,048,696 | Hellan | July 28, 1936 |
| 2,196,247 | Browne et al. | Apr. 9, 1940 |
| 2,316,981 | Smith | Apr. 20, 1943 |
| 2,375,852 | Kilchenmann | May 15, 1945 |